United States Patent [19]

Fretwell

[11] 3,842,207

[45] Oct. 15, 1974

[54] DATA SET CONTROL LOGIC

[75] Inventor: Richard D. Fretwell, Grove City, Ohio

[73] Assignee: MI², Incorporated, Columbus, Ohio

[22] Filed: Feb. 27, 1973

[21] Appl. No.: 336,278

[52] U.S. Cl. .............................. 179/2 DP, 178/66 R

[51] Int. Cl. .......................................... H04m 11/06

[58] Field of Search ......... 179/2 DP, 2 A, 3, 4, 6 E, 179/6 D, 5 P; 178/66 R

[56] References Cited

UNITED STATES PATENTS

| | | | |
|---|---|---|---|
| 3,524,935 | 8/1970 | Gonsewski | 179/2 DP |
| 3,527,891 | 9/1970 | Johnston | 179/2 A |
| 3,549,809 | 12/1970 | Stehr | 179/2 DP |
| 3,609,241 | 9/1971 | Riethmeier | 179/4 |
| 3,739,338 | 6/1973 | Jacobson | 179/2 DP |

*Primary Examiner*—Kathleen H. Claffy
*Assistant Examiner*—Thomas D'Amico
*Attorney, Agent, or Firm*—Cennamo, Kremblas & Foster

[57] ABSTRACT

A control logic circuit for a modem of the type connected to a direct access arrangement terminal unit. The modem has automatic answer, manual answer, originate, clear, local, voice and test modes. An abort timer has two alternative timing cycles, one for originate and the second for answer. The data set logic automatically interfaces to CBS or CBT systems and also automatically selected and operates in connection with two direct access arrangement terminal units.

10 Claims, 8 Drawing Figures

DATA SET CONTROL LOGIC

BACKGROUND

This invention relates generally to a logic control system for a data terminal and more particularly relates to the logic control circuit of a modem. The modem or data set is connected between conventional Teletype equipment and a pair of direct access arrangement terminal units which are in turn connected to telephone lines.

Computer data and other communication information are often transmitted over telephone lines, microwave links or other systems by means of frequency shift modulation. Data bits are transmitted in the form of mark and space pulses. Data pulses both to and from a terminal are demodulated and modulated respectively by the modem circuit. An input/output typewriter, storage device or other machine is connected to the modem for receiving demodulated incoming data and for sending outgoing data.

Desirably, such modem circuits are sufficiently flexible that they may be operated entirely automatically. An automatic data terminal has the capability of answering a call from a remote terminal and transmitting requested data to the remote terminal without the need for an operator being present. Additionally, such a data terminal should permit manual origination of a transmission, manual termination of transmissions and further should permit both local operation and testing by a remote test center.

CROSS REFERENCE

A complete description of a modem circuit and system wherein the present invention finds utility is in U.S. Ser. No. 112,954 for "Modem Circuit". Other related modem circuits are found in U.S. Ser. No. 144,540 for "Modem Corner Detecting Circuit" now U.S. Pat. No. 3,714,586; U.S. Ser. No. 170,116 for "Modem CBS/CBT Interface" now U.S. Pat. No. 3,716,672; and U.S. Ser. No. 150,955 "Modem Filter and Modulator". All of said applications and patents are assigned to the assignee of the invention herein described.

SUMMARY OF THE INVENTION

The invention is a control logic circuit for a modem of the type connected to a direct access arrangement including RI, DT, DR, DA and OH terminals, the modem having a modulator, a demodulator and a carrier detector which shifts from first to a second output level when a carrier is received. The logic circuit has an originate latching means having an originate state and an answer state. The originate latching means may be set to its originate state by a manual switch and also has a reset input for being reset to its answer state. A ring detector means is connected to receive a ring signal from an RI terminal and has an output which shifts to a second ring-indicating level in response to a ring signal. An abort timer means having two optional originate and answer timing cycles and an output which shifts from a first on hook level to a second off hook level during a timing cycle has a first input connected to the output of the ring detector for initiating an answer timing cycle in response to a ring signal. The abort timer means also has a second input connected to the output of the originate latching means for initiating an originate timing cycle when the originate latching means switches to its originate state. The abort timer also has a reset input connected to the carrier detector for resetting the timer means, a response to the receipt of a carrier. An OH driver means is connected to the output of the abort timer means for generating an off hook output condition during a timing cycle. The OH driver means has an output connected to said OH terminal and to the reset input of the originate latching means for resetting the originate latching means in response to a transition from an off hook state to an on hook state. The OH driver means also has an input connected to the carrier detector for generating the off hook output condition when a carrier is received.

It is accordingly an object of the invention to provide an improved logic control circuit for a data terminal.

Further objects and features of the invention will be apparent from the following specification and claims when considered in connection with the accompanying drawings illustrating the preferred embodiments of the invention.

Figure 1:
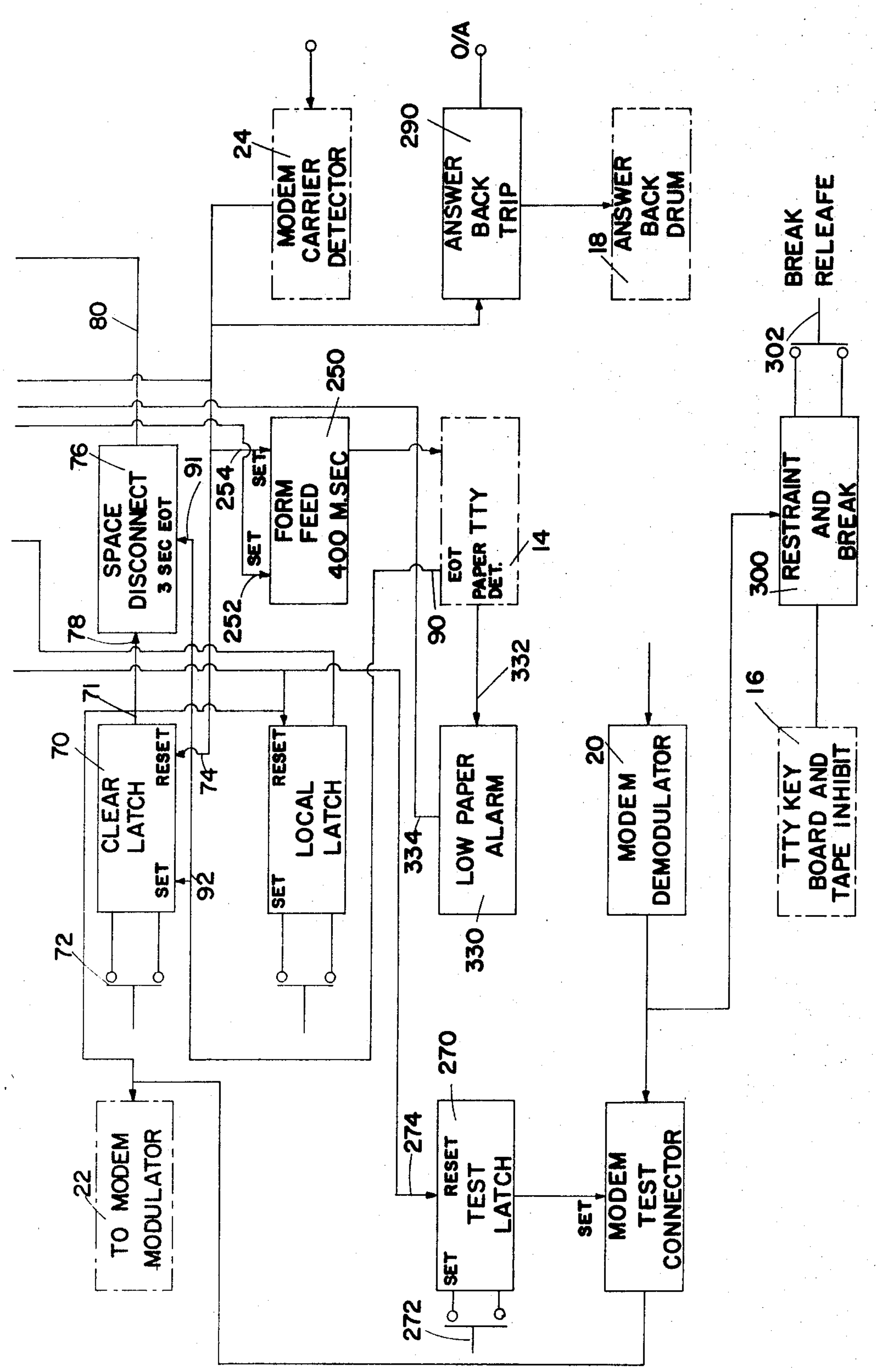
FIGS. 1 and 1A together comprise a simplified block diagram of the preferred embodiment of the invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the term "connection" or "connected" is often used and is not to be limited to direct connection but includes connection through other devices where such interruption would be understood by those skilled in the art. Connected includes connection through suitable interfacing circuits or switches where such devices effectively provide a connection.

DETAILED DESCRIPTION

Figure 1A:
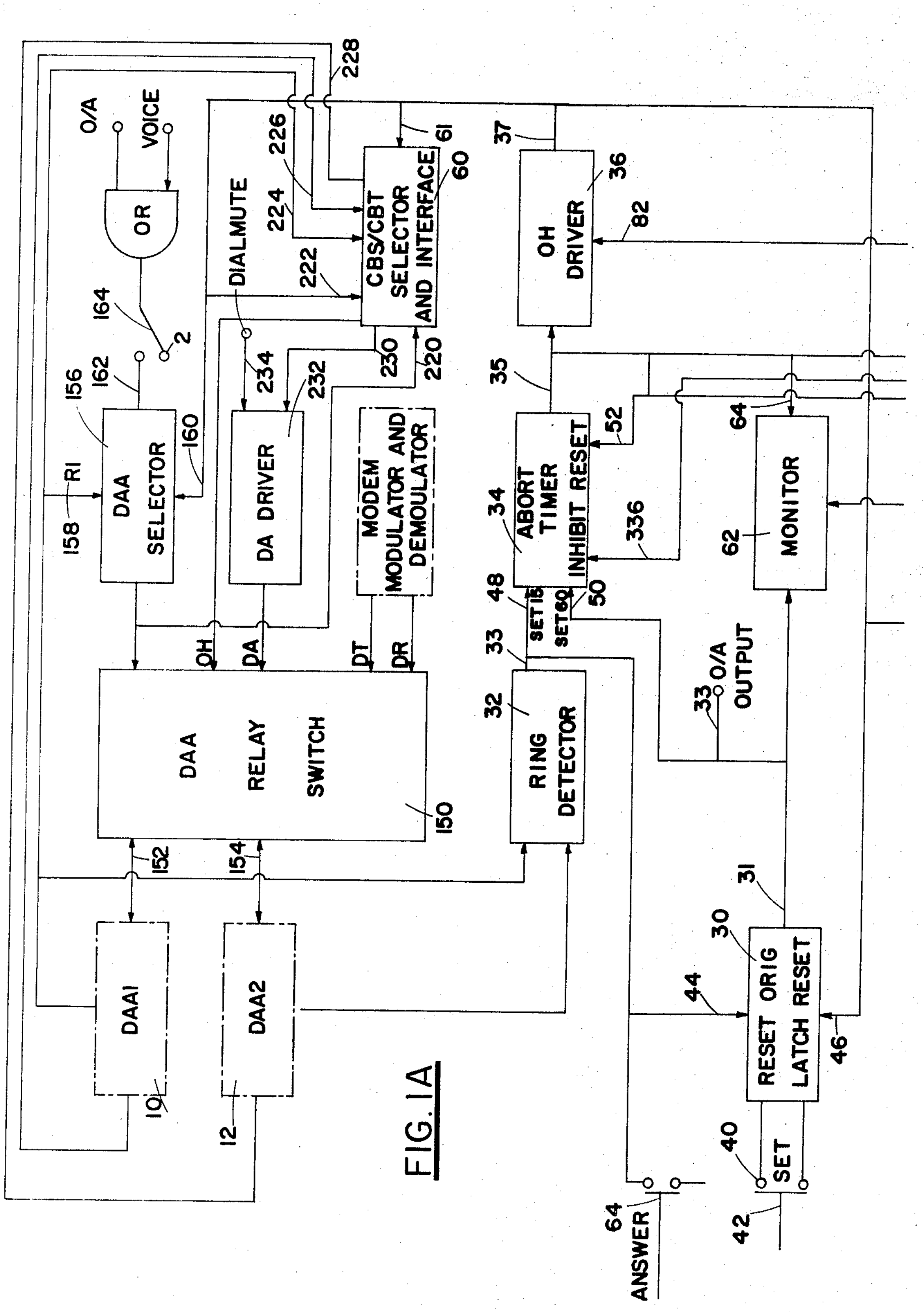

FIGS. 1 and 1A together illustrate a portion of a modem or data set. All portions of the entire modem are not illustrated because many parts do not directly interact with the logic control circuit of the invention. Illustrated in phantom are portions of other modem and teletype circuits or systems which are connected to the logic circuit embodying the present invention. For example, a pair of direct access arrangement terminal units 10 and 12 are conventionally wall terminal boxes provided by the telephone company. The Teletype equipment 14, 16 and 18 are conventionally supplied by Western Union. Similarly, the modem demodulator 20, the modem modulator 22 and the modem carrier detector 24 are circuits commonly found in various data sets or modems.

The basic components of the preferred embodiment of the present invention are an originate latching means 30, a ring detector 32 and abort timer means 34 and an OH driver means 36. These basic components could operate without the advantages of the remaining components and therefore will initially be discussed above. Such operation would, of course, not be as convenient as operation of the entire unit.

The originate latching means 30 is a device such as an ordinary flip-flop logic device having a first output level assigned as an originate state and a second output level assigned as an answer state. The originate latching means 30 has a set input 40 connected to a manual switch 42 for switching the originate latching means 30 to its originate state. The originate latch 30 also has a pair of reset inputs 44 and 46 for switching it to its answer state.

The ring detector means 32 has a pair of inputs connected to the RI terminals of the direct access arrangement terminal units 10 and 12. It should be understood however, that the circuit can operate with a single direct access arrangement and consequently a single RI input to the ring detector 32. The ring detector 32 has an output 33 which shifts from a frist to a second ring-indicating level in response to a ring signal input. Various ring detectors for performing this function are known in the art and therefore its internal circuitry is not illustrated.

The basic portion of the logic control circuit additionally has an abort timer means 34 having two optional originate and answer timing cycles. The output 35 of the abort timer means 34 shifts from a first on hook level to a second off hook level during a timing cycle. A first input 48 to the abort timer means 34 is connected to an output 33 of the ring detector 32 for initiating an answer timing cycle in response to a ring signal. The abort timer means 34 also has a second input 50 connected to the output 31 of the originate latching means 30 for initiating the originate timing cycle when the originate latching means switches to its originate state. The abort timer means 34 further has a reset input 52 connected to the modem carrier detector 24 for resetting the timer means 34 in response to the receipt of a carrier from a remote terminal.

The OH driver means 36 is connected to the output 35 of the abort timer means 34 for generating an off hook output condition during a timing cycle of the timing means 34. The OH driver means 36 also has its output 37 connected to the OH terminal of the direct access arrangement.

In the more complex preferred embodiment, this output 37 is connected to the OH terminal of the direct access arrangement through a CBS/CBT selecting interface means 60 and a direct access arrangement switching means 150 all discussed below. However, it should be understood that the output 37 of the OH driver means 36 could be directly connected to an OH terminal of a direct access arrangement.

The output 37 of the OH driver means 36 is also connected to the reset input 46 of the originate latching means 30 for resetting the latching means 30 in response to a transition from an off hook state to an on hook state. The OH driver means 36 also has an input terminal connected to the carrier detector 24 for generating the off hook output condition when a carrier is being received from a remote terminal.

It may also be noted that the originate latching means 30 has its output 31 also connected to various other parts of the circuitry. This is indicated generally as the O/A output 33. The logic level of the O/A output 33 indicates to the other circuits whether the modem is in the originate or the answer state. It is for example, connected to a monitor circuit 62 which initially connects the phone line to an audio speaker system when the circuit is first set into its originate condition. However, the monitor 62 is also connected at an input 64 to the modem carrier detector 24 so that the audio speaker system will be disconnected a short time interval after receipt of a carrier from a remote terminal.

A manual answer switch 64 is also connected to the reset input 44 of the originate latching means 30 for switching it to its answer state. This answer switch 64 is further connected to the abort timer means input 48 for initiating an answer timing cycle in response to operation of the answer switch 64.

The operation of the basic components of the logic circuit begin with the assumption that the originate latching means 30 is in its answer state, that the OH driver 36 is on hook and that there is no incoming ring signal.

The occurrence of a ring signal at an input of the ring detector 32 initiates the answer timing cycle of the short timer means 34. This timing cycle is preferably 15 seconds. Initiation of the timing cycle causes a level shift at the output 35 of the timer means 34 which switches the OH driver means 36 to an off hook condition at its output 37. Therefore, the data terminal is switched to an off hook condition. If carrier is not received from the remote terminal and detected by the carrier detector 24 within 15 seconds, the abort timer means 34 will switch its output to return the local terminal to its on hook condition. If however, a carrier is received and detected by the carrier detector 24 within the 15 seconds answer timing cycle, the output of the carrier detector 24 wil hold the OH driver 36 in its off hook output condition. Upon the termination of a transmission and consequent loss of carrier, the OH driver means 36 will then return to its on hook condition.

If an operator desires to operate the local terminal for originating a call, he manually depresses the originate switch 42 which sets the originate latching means to its originate state. This initiates an originate timing cycle by applying this transition to the input 50 of the abort timer means 34. During the originate timing cycle, the output 35 of the abort timer means 34 will hold the OH driver means 36 in an off hook output condition for preferably a 60 second originate timing cycle. If the operator makes a connection with a remote terminal within the 60 second period and receives carrier from the remote terminal, the output of the modem carrier detector 24 will again hold the OH driver 36 in its off hook output condition. However, if the operator is unable to receive carrier from a remote terminal within the 60 second period, the abort timer means 34 will end its originate timing cycle and again switch the OH driver means 36 to its on hook condition, thereby giving the operator 60 seconds in which to make a suitable connection.

Whenever the OH driver means 36 switches from an off hook to an on hook condition, the originate latching means is reset to its answer state.

The operation of the basic circuit described above may be improved by a clear circuit including a bistable, clear latching means 70 which may be a conventional flip-flop. The clear latching means 70 has a first output level for a clear state and a second output level for a normal state. It has a manually operable clear switch 72 for switching it to its clear state. It also has a reset input 74 connected to the carrier detector 24 for resetting the clear latching means 70 the normal state by the loss of a received carrier. The output 71 of the clear latching means 70 is connected to the reset input 52 of the abort timer means 34 for resetting the timer means when the clear latching means 70 is in its clear state.

The output of the modem carrier detector 24 is also connected to the reset input 52 of the abort timer means 34. In this manner, the appearance of a carrier as well as setting the clear latching means 70 to its clear state will reset the abort timer means 34 so that it will be ready for a subsequent timing cycle.

A space disconnect circuit means 76 which includes a disconnect timer has an input 78 connected to the output of the clear latching means 70 for initiating a disconnect timing cycle in response to a clear state. The disconnect means 76 has an output 80 connected to an input 82 of the OH driver means 36 for causing an on hook output to be generated by the driver means 36 a selected time interval after the clear latching means 70 switches to its clear state.

By operating the clear latching means 70 and through it the space disconnect circuit 76, a local operator may terminate a transmission. By depressing the clear switch 72 the operator switches the clear latching means 70 to its clear state. This initiates operation of the space disconnect timing circuit 76 to begin a preferably 3 second timing cycle. The output 71 of the clear latching means 70 simultaneously through its connection to the modem modulator 22 causes the modem modulator to transmit a continuous space signal. At the end of the space disconnect timing cycle, the space disconnect circuit 76 switches its output 80 to a disconnect level which switches the OH driver means 36 to its on hook condition. This effectively disconnects the local terminal from the telephone lines.

The standard Teletype keyboard is provided with an EOT (end of transmission) key for depression at the end of a transmission. The output 90 from the EOT key of the teletype 14 is connected to an EOT input 91 on the space disconnect circuit 76 and to a set input 92 at the clear latching means 70. Receipt of an EOT signal at the input 91 of the space disconnect circuit 76 immediately switches the space disconnect circuit 76 to a disconnect output state, thereby in effect causing it to go immediately through its timing cycle without the passage of time. The OH driver 36 therefore immediately takes the terminal off hook. Simultaneously, the EOT output from the output 90 of the Teletype 14 causes the clear latching means 70 to be set to clear state at its input terminal 92. Therefore, by depressing the EOT key, the operator immediately disconnects the local terminal.

Figure 2:
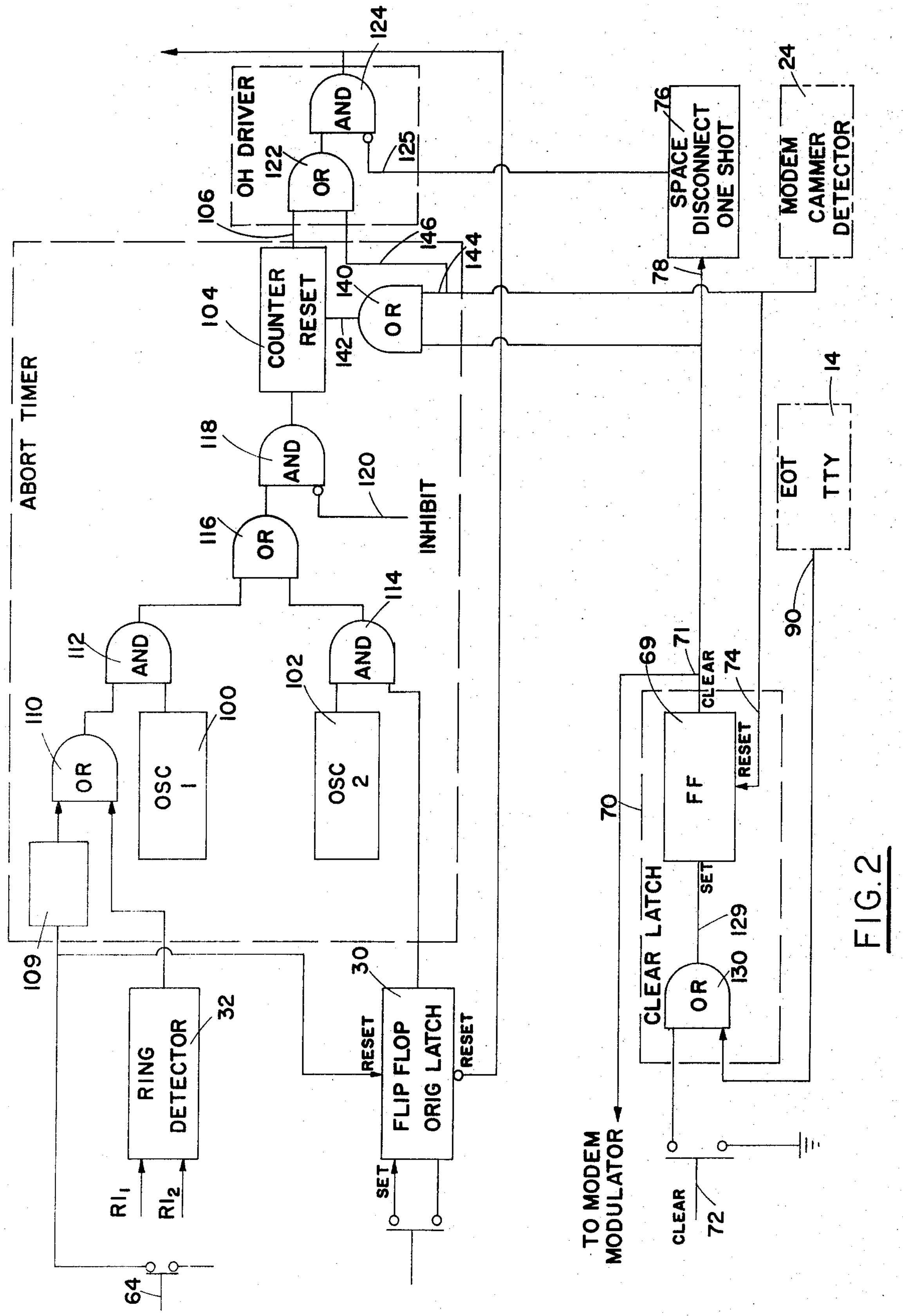
FIG. 2 is a block logic diagram illustrating in more detail a portion of the embodiment of FIG. 1.

FIG. 2 illustrates in more detail a logic block diagram of conventional blocks for performing the operations described with the circuitry above.

The abort timer may, for example, be a counter having a pair of oscillators including a first oscillator 100 and a second oscillator 102. The counter 104 has an output 106 which shifts to a second output level when it begins counting and returns to its first output level when it has counted a given number of pulses. For example, the first oscillator 100 may generate pulses at a 4 KHz rate. The counter may be designed or selected so that it will shift its output level, upon receipt of a first pulse, to an off hook condition and will be reset to an on hook condition and will be reset to an on hook condition after it has counted 60,000 pulses. This would provide the 15 second timing delay. Similarly, the second oscillator 102 may generate the pulses at a 1 KHz rate. Again, the counter will shift to its off hook output condition upon receipt of the first pulse from the second oscillator 102 and will shift back to an on hook condition after counting 60,000 pulses from the second oscillator 102. This however, will take 60 seconds since the second oscillator 102 oscillates at ¼ the frequency of the first oscillator 100. Consequently, a 60 second time cycle is provided. The logic circuit for gating the pulses from the oscillators 102 and 100 to the counter 104 includes an OR gate 110 connected to an AND gate 112 which together with an AND gate 114 is connected to a second OR gate 116 which in turn is connected to an AND gate 118. The AND gate 118 also has an input 120 from an inhibiting device such as low paper sensor to be described below. The output of the counter 104 is connected to the OH driver 36 which includes an OR gate 122 and an AND gate 124 connected to the output 37 of the OH driver means 36.

The originate latching means 30 may be flip-flop as described above. Similarly, the clear latching means 70 may be a conventional flip-flop 69 having a set input 129 connected to the output of an OR gate 130 which has a pair of inputs, one connected to the clear switch 72 and the other connected to the EOT output 90 of the teletype equipment 14. Similarly, the reset input 74 of the flip-flop 69 may be an inverting input connected to the output of the modem carrier detector 24. The output 71 of the flip-flop 69 is connected to the space disconnect circuit 76 which may be a one shot multivibrator having a set input 78. Additionally, the flip-flop output 71 is connected through an OR gate 140 to the reset input 142 of the counter 104. The output of the modem carrier detector 24 is also connected to an input 144 of the OR gate 140 and to an input 146 of the OR gate 122. The ring detector 32 and is connected to an input of the OR gate 110.

A one shot multivibrator 109 is connected between the answer switch 64 and an input to the OR gate 110 so that the answer switch 64 may be momentarily depressed while the answer signal is generated may be applied for a sufficiently length of time to the OR gate 110.

The operation of the circuit illustrated in FIG. 2 may begin with the assumption that the originate latching means 70 is in the answer state. Receipt of a ring detector 32 or depression of the answer switch 64 will switch the output of OR gate 110 and thereby gate the oscillator pulses from the first oscillator 100 through the AND gate 112 and the OR gate 116. If no inhibit signal is present at the input 120 at the AND gate 118, the output of the AND gate 118 will further gate these pulses to the counter 104. The counter will immediately shift its output level to an off hook condition and will maintain this condition until it counts the requisite number of pulses. The off hook condition is applied to OR gate 122 of the OH driver means 36. This will produce an off hook output level at the output 37 of the OH driver means 36 if there is no space disconnect signal applied at the input 125 of the AND gate 124. The data set will be taken off hook.

If the counter 104 counts the requisite number of pulses and no carrier is by then present, it will again switch states switching the output 37 of the OH driver 36 to an on hook condition. If, however, the modem carrier detector 24 senses an incoming carrier, it will shift the level at the input 146 of the OR gate 122 and thereby maintain the output 37 of the OH driver means 36 in an off hook condition. Subsequent loss of the carrier and therefore shift in the input 146 of the OR gate 122 will take the output 37 to an on hook condition.

If, in the alternative, the originate latching means 30 is initially in an originate state, the AND gate 114 will gate pulses from the second oscillator 102 through the OR gate 116 and through the AND gate 118 if no inhibit signal is present at the inhibit input 120. This will, in a similar manner, cause the output 37 of the OH driver means 36 to go to an off hook state. If carrier is subsequently received from a remote terminal, the modem carrier detector 24, acting at the input 146 of the OR gate input 122, will, as described above, maintain the output 37 of the OH driver means 36 in an off hook condition until carrier is lost.

Depression of the clear switch 72, connected to the OR gate 130 or receipt of an EOT key of the teletype 14, will set the flip-flop 69 to its clear state. This in turn will set the one shot 76 to its astable state so that after its timing period it will apply a disconnect signal at the input 125 of the AND gate 124. The disconnect signal will cause an on hook state at the output 37 of the OH driver means 36. It will similarly apply a clear signal to the OR gate 140 which will reset the counter 104. Loss of carrier, such as will occur when the data set is taken on hook, will result in a level shift at the input 74 of the flip-flop 70 to reset it to its normal non-clearing state.

Returning now to FIG. 1 and 1A, we may consider a circuit for converting the logic circuit level shifts at the output of the OH driver 36 to the conditions which are suitable for a CBS or CBT arrangement to which the modem is to be connected. Additionally, we may consider the circuit for automatically selecting which of two DAA terminal units the data set is to be connected.

Figure 3:
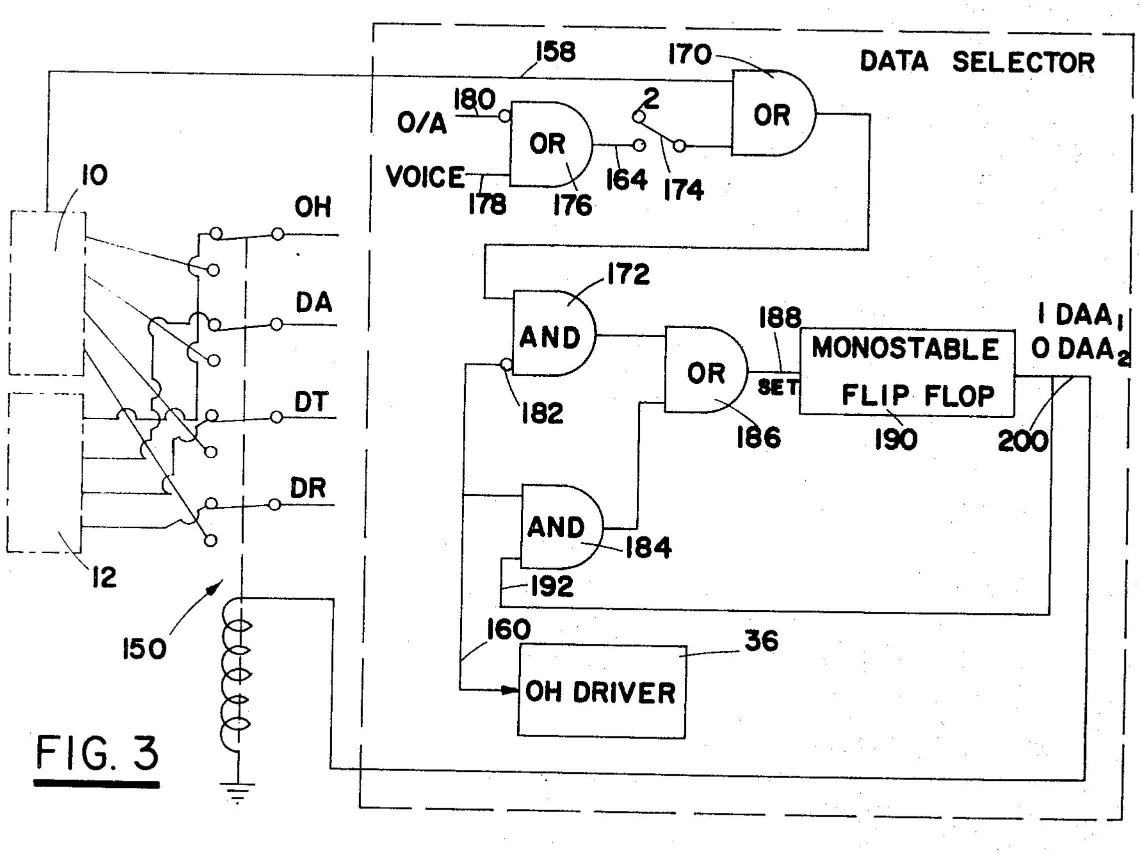
FIG. 3 is a block logic diagram in more detail of a portion of the preferred embodiment illustrated in FIG. 1.

A DAA relay switch 150 is used which is a simple four pole, doublethrow relay for alternatively, connecting the OH, DA, DT, DR connection from the modem to either the terminal box unit 10 or the terminal box unit 12. Therefore, the relay is connected at its outputs 152 and 154 to these terminal units. The connections into the DAA relay switch 150 are illustrated in FIG. 3. The relay itself is controlled by a DAA selector 156. The DAA selector 156 has an input 158 connected to the RI terminal of one of the terminal units 10. It has a second input 160 connected to the output 37 of the OH driver means 36 and a third input 162 connected to a manual selection switch 164.

The DAA selector 156 the DAA relay switch 150 to connect the modem to the DAA terminal unit 10 in response to a ring signal from its RI terminal and maintains this connection in response to an off hook output condition at the OH driver means 36. For all other conditions, the DAA selector 156 maintains the modem connected to the other DAA terminal unit 12.

The DAA relay switch 150 and the DAA selector 156 are illustrated in more detail in FIG. 3. The RI input from the DAA terminal unit 10 is connected to an OR gate 170 which in turn has its output connected to an OR gate 172. Similarly connected to an input of the OR gate 170 is a single pole, single throw, manual selection switch 174 which is in turn connected to the output of an OR gate 176. The OR gate 176 has an input 178 connected to the voice selecting switch and an input 180 connected to the O/A output terminal 33 at the output of the originate latching means 30 illustrated in FIG. 1 and 1A.

The output of the OH driver means 36 is connected to an inverting input 182 of the AND gate 172 and to an input of an AND gate 184. The AND gates 172 and 184 are connected to an OR gate 186 which in turn is connected to the set input 188 of a monostable multivibrator 190. The output 200 of the multivibrator 190 is connected to the input 192 of the AND gate 184 and to the control input of the DAA relay switch 150.

In operation the DAA selector 156 illustrated in FIG. 3, will normally be sitting at a 0 output condition at the output 200 of the flip-flop 190 which will not energize the relay of the DAA relay switch 150. Therefore, normally, the modem will be connected to the second DAA terminal unit 12.

If a ring signal comes in from the second DAA terminal unit 12, the DAA selector will remain in this condition. If however, a ring signal arrives at the DAA terminal unit 10, it will be applied through the OR gate 170 to the AND gate 172. If the modem is not in an off hook state as determined by the signal at the input 182 to the AND gate 172, the ring signal will be gated through the OR gate 186 to set the monostable flip-flop 190 to an output condition which will switch the DAA relay switch 150 into connection with the DAA first terminal unit 10.

The modem can now go off hook so that an input at the AND gate 180 from the output of the monostable flip-flop 190 together with an off hook condition from the OH driver 36 will now maintain the monostable flip-flop in its set condition so long as the circuit is maintained off hook. However, when the remaining circuitry switches the OH driver means 36 to an off hook condition, the monostable flip-flop 190 will be permitted to return to its reset condition thus returning connection of the modem to the second terminal unit 12.

Returning now to FIG. 1 and 1A, the CBS/CBT selector/interface 60 has an input 61 from the output 37 of the OH driver means 36. The logic level shifts at this input 61 must be converted by the selector and interface 60 to +15 and −15 volt levels for use with a CBS type DAA and to contact closure and open circuit conditions for CBT systems. It performs its interface functions on the basis of the input conditions it receives from the DAA selector at its input 220 and from inputs it receives from the RI terminals and the CCT terminals of the DAA terminal units 10 and 12 and its inputs 222, 224, 226 and 228.

Additionally, the CBS/CBT selector/interface has an output 230 to provide a signal indicating whether the modem is connected to a CBS or a CBT terminal unit. This permits the DA driver 232 to properly interface the dial mute contacts of the telephone dialer connected at its input 234 to the DA terminal of the DAA relay switch 150.

The DA driver 232 performs the ordinary function of muting the ear piece of the handset or the monitor during dialing and further prevents the dialing pulses from being received in the local modem.

Various other circuits are included with the basic circuit described above providing other advantages in the control logic circuit.

A form feed circuit 250 illustrated in FIG. 1 and 1A for advancing the print out paper for beginning a new message. It has a set input 252 connected to the output of the clear latching means 70 for being switched to an advance state in response to switching of the clear latching means 70 to its clear state when a carrier is being received. When the form feed circuit 250 is switched to an advance state, it initiates advance of the paper to the next beginning line by operating the advance mechanism of the teletype 14.

The form feed circuit 250 also has a second set input 254 connected to the output of the carrier detector 24 to assure that the form feed circuit 250 is operated only when carrier is present. This prevents form advance every time the clear switch 72 is operated. Advance only occurs at the end of a transmission.

Figure 4:
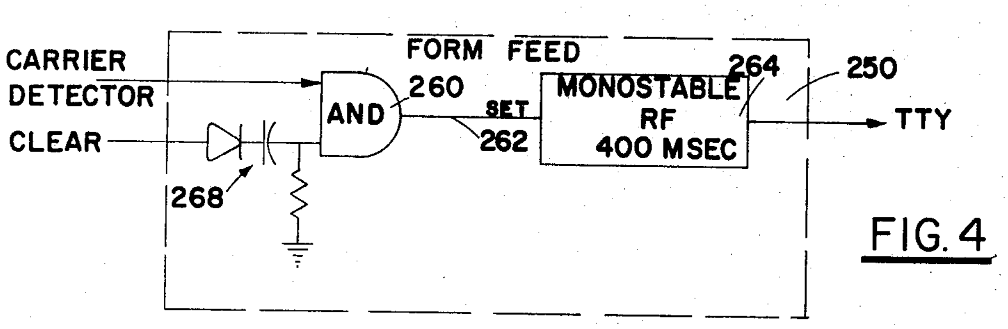
FIG. 4 is a logic block diagram showing in more detail a portion of the embodiment illustrated in FIG. 1.

FIG. 4 illustrates more detail of a form feed circuit 250 embodying the invention. It comprises simply an AND gate 260 having an output 262 connected to the set input of a monostable flip-flop 264. The simultaneous presence of a clear state and a carrier sets the monostable flip-flop 264 to provide a square timed output pulse from the monostable flip-flop 264 to provide a square timed output pulse from the monostable flip-flop 264. The differentiator circuit 268 assures that only one form feed pulse will occur for each depression of the clear switch 72.

Referring again to FIG. 1 and 1A, a test circuit is provided including a test latching means 270 which may simple comprise a bistable flip-flop having a set input connected to a manually actuable test switch 272 for switching its flip-flop to a test state and a reset input 274 connected to the output of the OH driver means 36 for being reset to a non-test state in response to an on hook output at the output 37 of the OH driver means 36. The test latching means 270 controls a connected, such as a simple electrically controlled switch, which connects the output of the modem modulator 20 to the input of the modem modulator 22 when the test latch means 270 is in its test state.

In operation, for a test, the operator may, after establishing a connection with the test center, merely depress the test switch 72 to connect the modem output to the modem input. This permits a test center to transmit a signal to the modem have it run through the modem circuitry and be returned to the test center for discovery of the effects in the modem circuitry.

In FIG. 1 and 1A an answer back trip circuit 290 is provided for actuating the answer back drum 18 of the teletype in response to the beginning of any transmission which is an answer to a call originating from a remote station.

Figure 5:
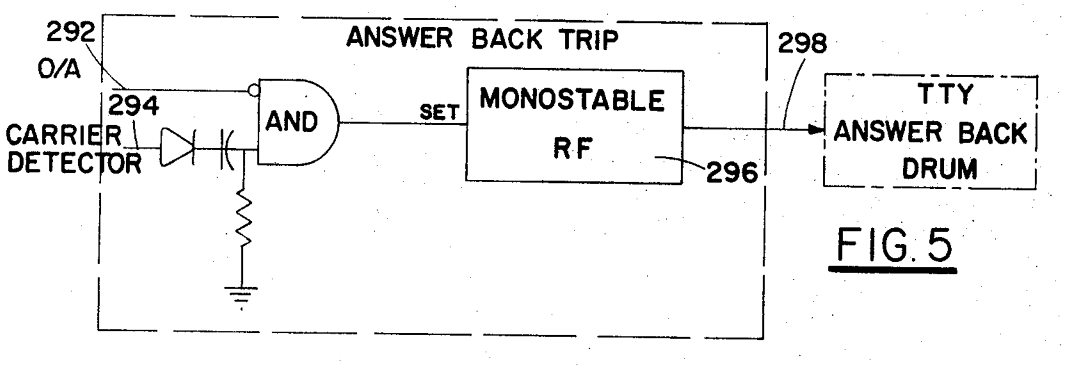
FIG. 5 is a logic block diagram showing in more detail a portion of the embodiment illustrated in FIG. 1.

FIG. 5 illustrates in more detail the answer back trip mechanism. It comprises an AND gate having an inverting input 292 from the O/A output 33 at the output of the originate latching means 30 and a differentiated input 294 from the carrier detector 24. When the modem is in its answer state and a carrier is first detected a monostable multivibrator 296 will be set and provide an output pulse of selected duration. This output pulse at the output 298 will trip the answer back drum present on the standard teletype mechanism.

Returning to FIG. 1 and 1A, the control circuit is additionally, equipped with a restraint and break circuit means 300 for selectively inhibiting a tape reader and a keyboard of a data terminal when appropriate.

Conventionally, a restraint signal is generated by an intermediate buffer which accumulates data when the local terminal transmits data at a rate faster than it can be processed by a remote terminal. When the buffer is nearly filled, it generates a restraint signal which is transmitted to the transmitting terminal and is intended to stop operation of the terminal's tape reader and thereby stop transmission of data.

When operating the local terminal with data generated by a manually operated keyboard rather than a tape, the restraint signal illuminates a restraint warning light to tell the operator that she should slow down or stop operating the keyboard because the buffer is being filled. However, some operators refuse to slow down upon the lighting of the restraint signal and consequently when the buffer is filled it transmits to the local terminal a break signal. This is intended to lock up the operators keyboard so that she may no longer transmit data until after the buffer is cleared. In the circuit of the invention, we provide a break relay release switch 302 which must be depressed by the operator in order to release the keyboard for subsequent operation.

Figure 6:
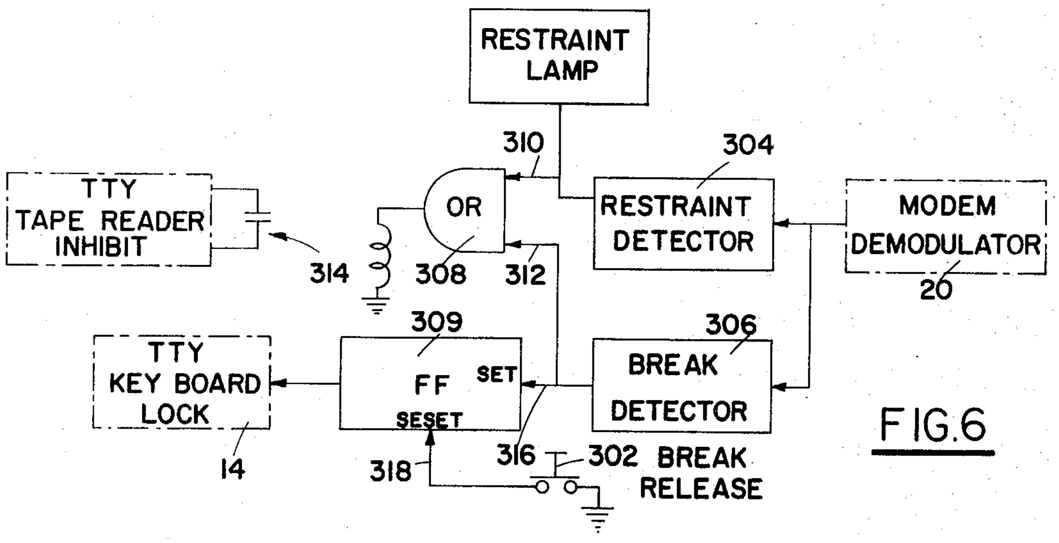
FIG. 6 is a logic block diagram showing in more detail a portion of the embodiment illustrated in FIG. 1.

FIG. 6 illustrates the restraint break circuit means 300 in more detail. It includes a restraint signal detector 304 connected to the modem demodulator for shifting from a first to a second output level in response to a restraint signal. It also has a break signal detector 306 connected to the modem demodulator 20 for shifting from a first to a second output level in response to a break signal. An OR gate 308 has one input 310 connected to the output of the restraint detector 304 and another input 312 connected to the output of the break detector 306. Therefore, receipt of either a restraint signal or a break signal operates the OR gate 308 which in turn operates a switch means 314 which inhibits the tape reader.

A bistable means, such as a conventional flip-flop, is provided having a set input 316 connected to the output of the break detector 306 and a reset input 318 connected to the manually actuable reset break release switch 302. The output of the bistable multivibrator 309 is connected to the keyboard inhibit means of the conventional teletype for inhibiting the keyboard in response to a break signal and for releasing the keyboard in response to the actuation of the manual switch 302 after disappearance of the break signal.

Finally, referring again to FIG. 1 and 1A, the control logic circuit has a low paper alarm circuit 330 which has an input 332 from the paper detector of the teletype 14 for signalling that the printout paper supply is low. An output 334 of the low paper alarm 330 is connected to the inhibit input 336 of the abort timer means 34. When paper is low the inhibit input of the abort timer means 34 prevents a subsequent call from being answered although it permits completion of a current call.

Figure 7:
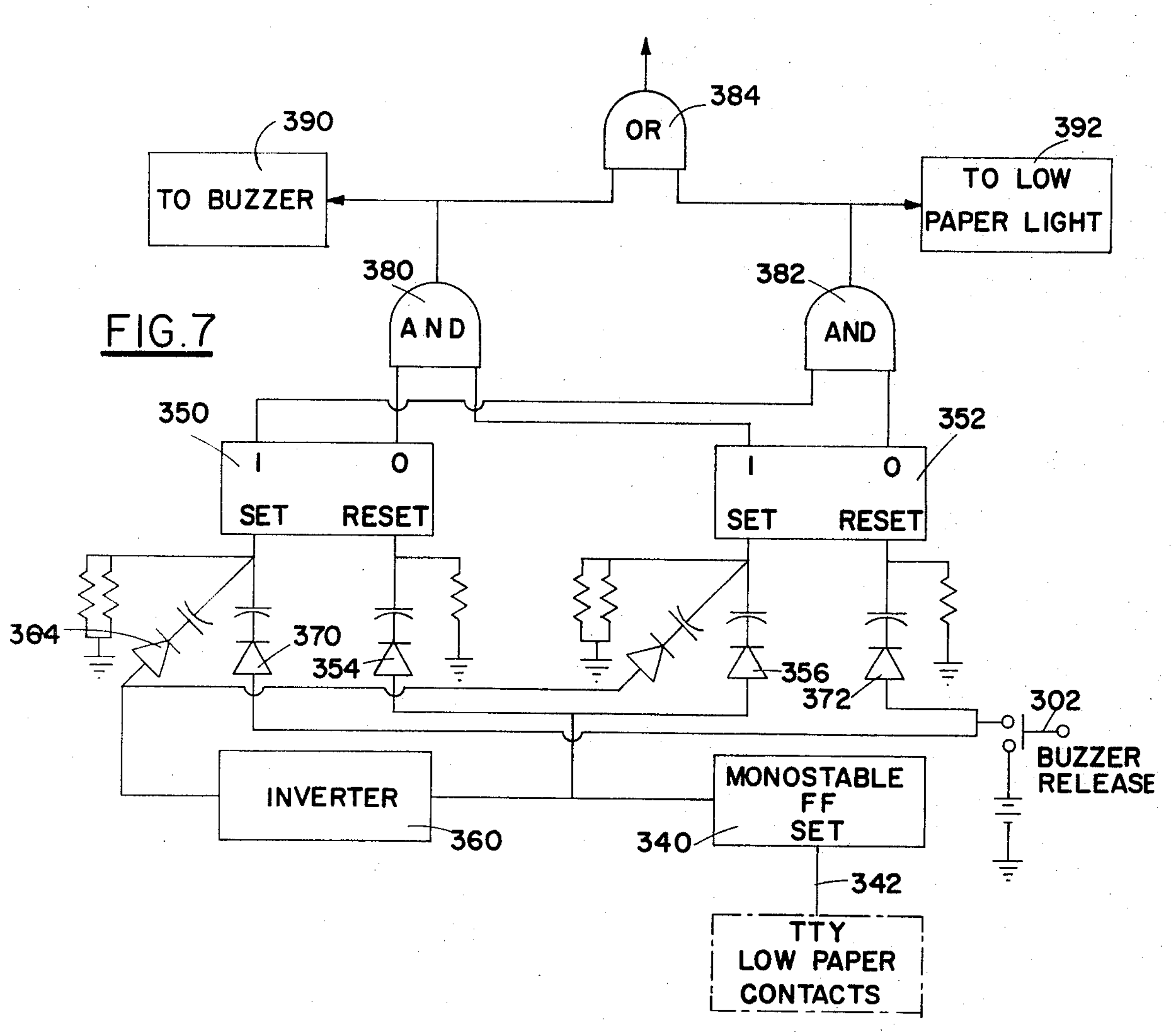
FIG. 7 is a logic block diagram showing in more detail a portion of the embodiment illustrated in FIG. 1.

A low paper alarm means is illustrated in more detail in FIG. 7. The conventional teletype low paper sensing device includes a pair of contacts which close when the printout paper supply becomes low. These terminals may be connected to a monostable multivibrator 340 having its set input 342 connected to these low paper contacts. The low paper alarm circuit 330 has a memory means having at least 3 states. For example, a pair of flip-flops 350 and 352 would perform this needed function. The flip-flop memory can be set to a first 01 state through steering diodes 354 and 356 when the monostable flip-flop 340 is set in response to low paper condition. It may be set to an 11 state when the monostable flip-flop 340 is returned to the full paper condition. A pulse through the inverter 360 and the steering diodes 362 and 364 will set the 11 state. The outputs to the flip-flop 350 and 352 also include a manual buzzer release switch 302 which is connected to the flip-flop memory means through steering diodes 370 and 372 for setting the flip-flops 350 and 352 to a 10 state.

AND gates 380 and 382 having their outputs connected to an OR gate 384 provide the requisite output conditions and are connected as shown to an audible signalling means 390 and a low paper signal light 392.

When a low paper condition causes the monostable flip-flop 340 to be set, the flip-flops 350 and 352 are set to a 01 condition. The AND gate 380 detects this condition and sounds the buzzer 390. Manual depression of the buzzer release 302 sets the flip-flops 350 and 352 to an 11 state which is detected by the AND gate 382 to turn on the low paper light 392. This change of state additionally cuts off operation of the buzzer 390. However, with either the buzzer 390 or the lower paper light 392 actuated, the OR gate 384 will apply an inhibit signal to the abort timing means 34. When paper is added to the teletype machine the monostable flip-flop will again reset causing the flip-flops 350 and 352 to be set in an 11 state. Such a state will turn off the low paper light 392, maintain the buzzer 390 in its off condition and cease application of the inhibit signal from the OR gate 384.

It is to be understood that while the detailed drawings and specific examples given describe preferred embodiments of the invention, they are for purposes of illustration, that the apparatus of the invention is not limited to the precise details and conditions disclosed and that various changes may be made therein without departing from the spirit of the invention which is defined by the following claims.

What is claimed is:

1. A control logic circuit for a modem of the type connected to a direct access arrangement including RI, DT, DR, DA and OH terminals, the modem having a modulator, a demodulator and a carrier detector for shifting from a first to a second output level when a carrier is received, the logic circuit comprising:

a. an originate latching means having a first output level for an originate state and a second output level for an answer state, the originate latching means having a set input connected to a manual switch for switching to the originate state, and a reset input for switching to the answer state;

b. a ring detector means having its input connected to said RI terminal and having an output for shifting from a first to second ring-indicating level in response to a ring signal input;

c. an abort timer means having originate and answer timing cycles and an output which shifts from a first on hook level to a second off hook level during a timing cycle, the abort timer means having a first input connected to the output of said ring detector for initiating an answer timing cycle in response to a ring signal, the abort timer emans also having a second input connected to said output of said originate latching means for initiating said originate timing cycle when said originate latching means switches to its said originate state, said abort timer means further having a reset input connected to said carrier detector for resetting said timer means in response to the receipt of a carrier;

d. an OH driver means connected to the output of said abort timer means for generating an off hook output condition during a timing cycle, said driver means having an output connected to said OH terminal and to said reset input of said originate latching means for resetting said originate latching means in response to a transition from an off-hook state to an on hook state, the driver means also having an input terminal connected to said carrier detector for generating said off hook output condition when a carrier is being received.

2. A logic circuit according to claim 1 wherein said originate latching means is provided with a reset input for switching it to said answer state and wherein a manually operable answer switch is connected to said reset input and to said first input of said abort timer means for switching said originate latching means to its answer state and for initiating said answer timing cycle in response to operation of said answer switch.

3. A logic circuit according to claim 2 wherein a bistable clear latching means is provided having a first output level for a clear state and a second output level for a normal state, the latching means having a manually operable clear switch for switching the clear latching means to said clear state and having a reset input connected to said carrier detector for being reset to said normal state by the loss of a received carrier, the output of said clear latching means being connected to said reset input of said abort timer means for resetting said timer when in said clear state.

4. A circuit according to claim 3 wherein a space disconnect means is provided which includes a disconnect timer and an input connected to the output of said clear latching means for initiating a disconnect timing cycle in response to a clear state, the disconnect means having an output connected to said OH driver means for causing an on hook output to be generated by said driver means a selected time interval after said clear latching means switches to said clear state.

5. A circuit according to claim 3 wherein said circuit further comprises:

a. a form feed logic means having a first set input connected to the output of said clear latching means and a second set input connected to the output of said carrier detector for being switches to an advance state in response to switching of said clear latching means to said clear state when a carrier is being received, response to the loss of a received carrier; and b. a print out advancing means connected to an output of said form feed logic means for advancing said advancing means when said form feed logic means is switched to said advance state.

6. A circuit according to claim 3 wherein said modem alternatively connectable to one of two DAA terminal units and wherein said circuit further comprises:

a. a DAA switching means comprising a plurality of switches controlled by a single input for connecting the terminals on one DAA terminal unit to said modem in response to a first input state and for connecting the terminals of the other DAA unit to said modem in response to a second input state;

b. a DAA selector having its output connected to said switching means input and having a set input connected to the RI terminal of one of said terminal units, a second input connected to the output of said OH driver means, and having a third manual input for connecting said modem to said one DAA terminal unit in response to a ring signal from said one unit in response to a first input condition at said manual selection input, for maintaining a modem connection in response to an off hook condition of said OH driver, and for connecting said modem to the other DAA terminal unit for all other input conditions.

7. A circuit according to claim 6 wherein said DAA selector comprises:

a. a monostable flip-flop means having its output as the output of said DAA selector and having a set input;

b. a first or gate having a pair of inputs and its output connected to said set input of said flip-flop means;

c. a pair of and gates connected to the input of said first or gate, the inputs of one and gate connected to the output of said OH driver and to the output of said flip-flop means, one input of the other and gate being an inverting input and connected to said OH driver;

d. a second or gate having its output connected to said other and gate, one input connected to the RI terminal of one DAA terminal unit and another input connected to a manual selector switch.

8. A circuit according to claim 3 wherein said circuit further comprises:

a. a test latching means having a first output level for a test state and a second output level for a no-test state, said test latching means including a manually actuable test switch and a reset input connected to the output of said OH driver means for switching to a test state in response to the operation of said test switch and for being reset upon switching to an on hook state; and b. a test connector for connecting the output of said modem demodulator to the input of said modem modulator when said test latch means is in said test state.

9. A circuit according to claim 3 wherein said circuit further includes a restraint and break means for selectively inhibiting a tape reader and a keyboard and a data terminal, said restraint and break means comprising:

a. a restraint detector connected to the modem demodulator for shifting from a first to a second output level in response to a restraint signal;

b. a break detector connected to said demodulator for shifting from a first to a second output level in response to a break signal;

c. an or gate having one input connected to the output of the restraint detector and another input connected to the output of the break detector;

d. switch means controlled by said gate for inhibiting said tape reader in response to a restraint signal or break signal; and e. bistable means having a set input connected to the output of said break detector and a reset input connected to a manually actuable reset switch and an output connected to a keyboard inhibit means for inhibiting said keyboard in response to a break signal and for releasing said keyboard in response to actuation of said manual switch.

10. A circuit according to claim 3 wherein said circuit further comprises a low paper signalling means connected to a pair of contacts which close when the supply of printout paper for said data terminal is low, said signalling means comprising:

a. a memory means having at least three states, said memory means having inputs for selecting said states, one of said inputs connected to said pair of contacts for being set to a first state when said paper is low and to a second state when said paper is not low;

b. manual switch means connected to a memory means input for setting it to a third state;

c. audible signalling means connected to the memory means for being energized when said memory means is in said first state; and d. signal light means for being energized when said memory means is in said third state.

* * * * *